(12) United States Patent
Hoerger

(10) Patent No.: US 12,235,569 B1
(45) Date of Patent: Feb. 25, 2025

(54) INTEGRATED SELFIE ATTACHMENT

(71) Applicant: Carl Robert Hoerger, Boise, ID (US)

(72) Inventor: Carl Robert Hoerger, Boise, ID (US)

( * ) Notice: Subject to any disclaimer, the term of this patent is extended or adjusted under 35 U.S.C. 154(b) by 125 days.

(21) Appl. No.: 18/173,790

(22) Filed: Feb. 24, 2023

(51) Int. Cl.
| | |
|---|---|
| *G03B 17/56* | (2021.01) |
| *A45B 1/00* | (2006.01) |
| *A63C 11/22* | (2006.01) |
| *F16M 13/08* | (2006.01) |

(52) U.S. Cl.
CPC .............. *G03B 17/561* (2013.01); *A45B 1/00* (2013.01); *A63C 11/227* (2013.01); *F16M 13/08* (2013.01)

(58) Field of Classification Search
None
See application file for complete search history.

(56) References Cited

U.S. PATENT DOCUMENTS

| | | | |
|---|---|---|---|
| 4,530,580 | A | 7/1985 | Ueda |
| 7,684,694 | B2 | 3/2010 | Fromm |
| 9,101,818 | B2 | 8/2015 | Carr |
| 9,103,487 | B2 | 8/2015 | Hale |
| D739,853 | S | 9/2015 | Lee |
| 9,170,473 | B1 | 10/2015 | Li |
| 9,420,712 | B2 | 8/2016 | Yang |
| 9,618,153 | B2 | 4/2017 | Hale |
| D798,940 | S | 10/2017 | Costa |
| 10,126,635 | B2 | 11/2018 | Hale |
| D839,339 | S | 1/2019 | Balmer |
| D911,427 | S * | 2/2021 | Silva Casas ................. D16/244 |
| D978,228 | S * | 2/2023 | Qiu .............................. D16/245 |
| D996,507 | S * | 8/2023 | Zhang .......................... D16/243 |
| 2006/0257137 | A1 | 11/2006 | Fromm |
| 2017/0108167 | A1* | 4/2017 | Fan ........................ F16M 11/10 |
| 2017/0277021 | A1 | 9/2017 | Sultan |
| 2023/0161230 | A1* | 5/2023 | Hahn ...................... H04N 23/55 |
| | | | 396/428 |
| 2023/0213841 | A1* | 7/2023 | Guess ..................... F16M 13/04 |
| | | | 396/422 |
| 2023/0380555 | A1* | 11/2023 | Unice ....................... A45B 9/02 |

FOREIGN PATENT DOCUMENTS

| | | |
|---|---|---|
| CA | 3019293 A1 | 4/2020 |
| CN | 105011494 A | 4/2015 |
| CN | 105485499 A | 4/2016 |
| CN | 205359376 U * | 7/2016 |
| CN | 107373939 A | 11/2017 |

(Continued)

OTHER PUBLICATIONS

Action Mount® | Pole Mounting Bracket with Locking Phone Clamp. Attach Your Phone to Any Pole for Use with Sport Camera. Compatible with GoPro Cameras and Accessories. (Tube Mount w/Phone Mount), us.amazon.com/, date first available Mar. 17, 2016. (Year: 2016).*

(Continued)

*Primary Examiner* — Rodney E Fuller

(57) ABSTRACT

A cell phone is attached to a pole not normally used to take photos so that it can be used as a selfie stick. The phone holder is attached to a ski or hiking pole with a pivot and split ring clamp. The phone holder nestles around the pole when skiing or hiking so as not to interfere with that activity. The phone holder is rotated into an open position to attach a phone allowing its use as a selfie stick.

8 Claims, 16 Drawing Sheets

(56) References Cited

FOREIGN PATENT DOCUMENTS

| | | | |
|---|---|---|---|
| CN | 208185758 U | * | 12/2018 |
| CN | 208397663 U | * | 1/2019 |
| CN | 109453506 A | | 3/2019 |
| CN | 209462433 U | * | 10/2019 |
| CN | 106641626 B | | 11/2019 |
| CN | 213333170 U | * | 6/2021 |
| CN | 217441322 U | * | 9/2022 |
| DE | 202005009976 U1 | | 9/2005 |
| DE | 202007012706 U1 | | 11/2007 |
| DE | 102015003793 A1 | | 9/2016 |
| DE | 202024101302 U1 | * | 5/2024 |
| EP | 3396452 B1 | | 7/2020 |
| ES | 2546689 B1 | | 5/2016 |
| IN | 107281737 A | | 10/2017 |
| JP | 3235678 U | | 1/2022 |
| KR | 200386178 Y1 | | 6/2005 |
| KR | 20060121539 A | | 11/2006 |
| KR | 20100011636 U | | 12/2010 |
| KR | 20110094482 A | | 8/2011 |
| KR | 20110109634 A | | 10/2011 |
| KR | 200479930 Y1 | | 3/2016 |
| KR | 20170001080 A | | 1/2017 |
| KR | 101702242 B1 | | 2/2017 |
| KR | 20170003877 U | | 11/2017 |
| KR | 102104427 B1 | | 4/2020 |
| KR | 20200136284 A | | 12/2020 |
| KR | 20210062526 A | | 5/2021 |
| KR | 20220154983 A | * | 11/2022 |

OTHER PUBLICATIONS

Selfskie, web.archive.org/web/20211019070051/https://www.selfskie.com/, Oct. 19, 2021. (Year: 2021).*

Selfskie—Attach Your Smartphone Or GoPro To Any Stick, https://selfskie.com/ (last visited Dec. 23, 2023).

Selfskie—Package Deal White and Blue, https://selfskie.com/product/et-quasi-architec/ (last visited Dec. 13, 2023).

* cited by examiner

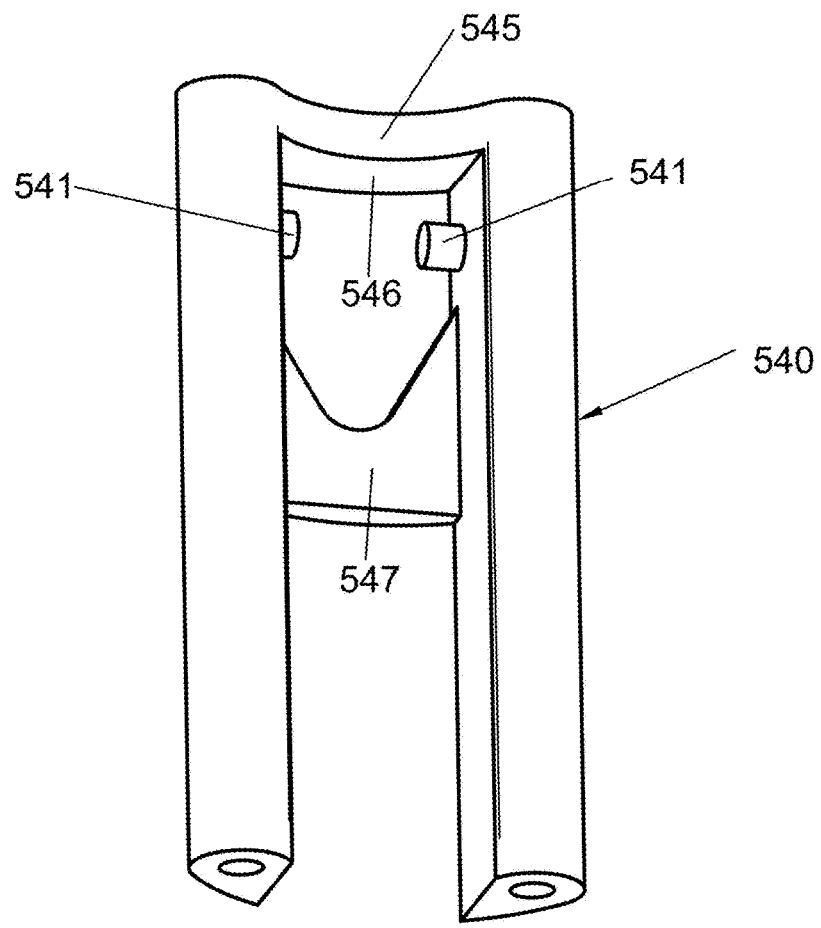
Fig. 13
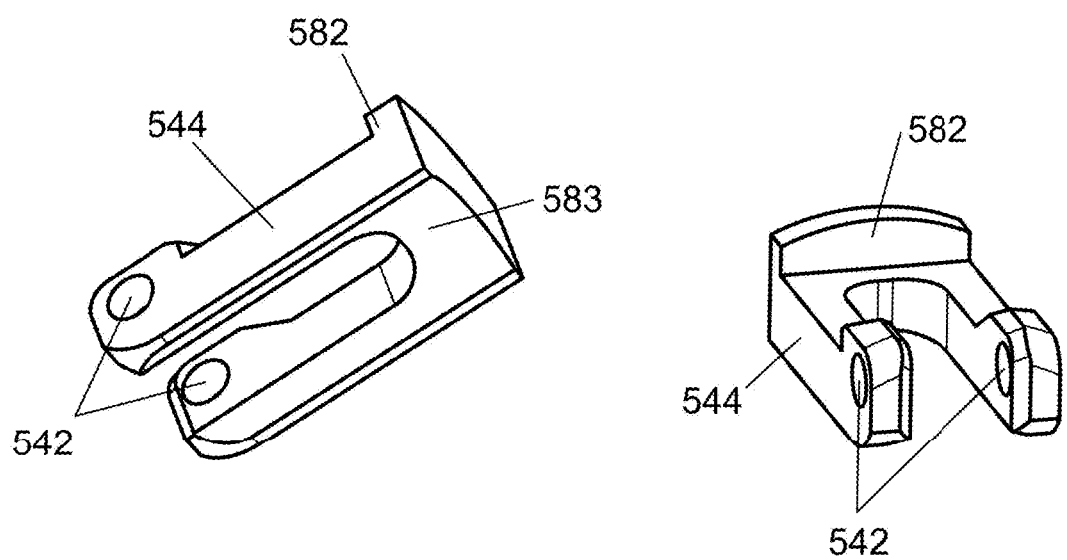
Fig. 14A
Fig. 14B

INTEGRATED SELFIE ATTACHMENT

CROSS-REFERENCE TO RELATED APPLICATIONS

63/380,417

FEDERALLY SPONSORED RESEARCH

None

SEQUENCE LISTING

None

BACKGROUND-PRIOR ART

The following is a tabulation of some prior art that presently appears relevant:

| U.S. patents | | | |
|---|---|---|---|
| Patent Number | Kind Code | Issue Date | Patentee |
| 4530580 | A | 1985 Jul. 23 | Ueda et al. |
| 9101818B2 | B2 | 2015 Aug. 11 | Carr |

| Foreign Patent Documents | | | | |
|---|---|---|---|---|
| Publication Nr. | Country Code | Kind Code | Publ. Date | App or Patentee |
| 20100011636U | KR | U | 2010 Dec. 1 | Yeong |
| 20060121539A | KR | A | 2007 Mar. 23 | Han |
| 202005009976U1 | DE | U1 | 2005 Sep. 8 | Kleingries |
| 101702242-B1 | KR | B1 | 2017 Feb. 2 | Ahn |
| CA-3019293-A1 | CA | A1 | 2020 Apr. 1 | Brough |
| DE102015003793A | DE | A | 2016 Sep. 29 | Gleich |
| JP3235678U | JP | U | 2022 Jan. 12 | Ueda, et al. |
| KR20170003877U | KR | U | 2017 Nov. 15 | Kim |

Non-Patent Literature Documents

Selfskie-Attach Your Smartphone Or GoPro To Any Stick, https://selfskie.com/(last visited Dec. 23, 2023).

With the widespread use of mobile phones, it has become popular to take selfies to capture an image of the user in an interesting environment. Although selfies are often taken by holding the phone at arm's length and shooting back toward the user, the resulting photos are often somewhat distorted. Selfie sticks have become a helpful means to improve the image quality. However, when engaged in activities such as skiing or hiking it is inconvenient to carry a separate selfie stick. In these situations, if there were a convenient way to attach a phone to a ski or hiking pole, it could be used as a selfie stick.

Early selfie stick designs began to appear in the 1980's, see for example U.S. Pat. No. 4,530,580 (1985). These were designed for compact cameras, as the time predated compact mobile phones. Most cameras contained a threaded hole to mate with a tripod screw. Although adding an attachment screw to a ski or hiking pole is simple in concept, many designs were rather inconvenient at providing flexibility to adjust the camera angle. With the complexity of attaching a mobile phone, designs have become even more unwieldy or inconvenient. Prior designs are discussed below.

Hiking Poles and Canes

Simple designs to use a hiking pole as a camera holder were intended for use as a monopod or tripod, rather than a selfie stick. They involved mounting the camera on top of the handle with a simple screw mount and then sticking the pole into the ground or opening a set of legs in the pole base to act as a tripod (see for example, KR20100011636U (2010)). These designs lacked the ability to fully adjust camera angle for use as selfie sticks.

They are also not readily adaptable to attaching phones. Other designs allowed additional angular adjustment by providing a separate attachment to the pole which can be removed while hiking or stored within the handle (see for example: KR20060121539A (2007) or DE202005009976U1 (2005)). These designs had the inconvenience of requiring separate hardware to be purchased, carried along, and then assembled, or had a bulky piece permanently attached to the pole.

Attaching a mobile phone to the pole has proven even more difficult. One approach is to provide a phone holder above the handle, hidden by a cylindrical cover. It is used by first removing the cover. Then it may be used by placing the phone on the handle end or removing the phone holder and attaching it to the opposite end of the pole (see for example KR-101702242-B1 (2017)). This approach adds significant weight to the pole and has the inconvenience of removing the cover and not losing it. Also, it may not be easily retrofitted to existing poles.

Ski Poles

Several designs for ski poles have followed along similar lines of those for hiking poles (see for example: U.S. Pat. No. 9,101,818B2 (2015)). In addition, some ski poles have large baskets which have been used for the phone attachment. For example, CA-3019293-A1 (2020) uses fingers molded into the basket to support the phone. The phone must be secured by an elastic band to prevent it from falling when held at a distance. This design lacks flexibility to adjust camera angle and requires an extra part to be carried along. In addition, it requires a fairly large basket to support the phone. Many ski poles do not have large enough baskets. The design is also not applicable to other types of equipment that do not include a basket.

Another design, DE102015003793A1 (2016), makes use of a slot molded into the basket. A camera adapter is placed into the slot. Although this can solve the flexibility issue, it suffers from the other disadvantages mentioned regarding CA-3019293-A1 (2020).

Another design, Selfskie, "Selfskie-Attach Your Smartphone Or GoPro To Any Stick," attaches a phone holder onto a pole with a large mount. The phone holder folds down onto the mount when it is not used. However, the mount is relatively heavy and bulky, causing the phone holder to extend more than 25 mm beyond the pole. The bulkiness has the potential for interfering with the normal use of the pole, such as snagging on clothing or other equipment. And, at 46 grams, the weight of the Selfskie increases the swing weight of the pole. Bulkiness and swing weight are particularly detrimental to cross country skiing. As will be seen from the below description, some embodiments of this application result in a phone holder extending as little as 6 mm from the pole and weighing approximately half as much as the Selfskie. Such embodiments are very desirable for activities like cross country skiing or golf where weight and bulk are critical.

Other Equipment

One design (JP3235678U, (2022)) replaces the head of a golf club with a phone holder to make a selfie stick. This requires the extra piece of equipment to be carried along, so it does not solve the issue of integrating into an existing piece of equipment.

Several designs have also attached phone holders to umbrellas (see for example KR20170003877U (2017)). These involve a bulky phone holder attached to the tip or handle of the umbrella. These increase the size of the umbrella making storage more difficult.

Advantages

Embodiments of this application allow a person to take selfie photos while skiing or hiking without the need to carry a separate selfie stick. This relieves the need to remember to pack a selfie stick while preparing for the activity as well as reducing the weight to be carried.

As will be seen from the below description, embodiments of this application have many advantages over the existing art. Some embodiments do not obstruct the activity, such as skiing or hiking. This is because they are not bulky and are conveniently stowed while not taking selfies. They are easy to switch from the stowed position to the position to take selfies. Some embodiments are very light weight and inexpensive to manufacture. They do not require additional pieces of equipment to be carried separately and then attached to the equipment. Some embodiments may be retrofitted into existing equipment or integrated into new designs. Some embodiments are also applicable to other sports or even household activities that utilize a rod, pole or shaft as part of their equipment. Examples of such equipment include, but are not limited to, golf clubs, fishing poles, fishing wading staffs, umbrellas, brooms, shovels and rakes.

SUMMARY

The object of the integrated selfie attachment is to eliminate the need for a separate selfie stick by making use of another piece of equipment in a compact and convenient way. In addition, the integrated selfie attachment does not restrict the normal use of the piece of equipment. This allows a person to take selfie photos while skiing, hiking, or other activity without the need to carry a separate selfie stick. The term "normal use" should be interpreted to mean the use of a piece of equipment in the activity for which it is designed other than taking photos. For example, normal use of a ski pole is skiing; normal use of a golf club is hitting a golf ball.

While the term "phone" is frequently used in this application it should be appreciated that the term "phone" should be interpreted as anything capable of capturing an image such as a smart phone, a tablet, a film camera, a digital camera, a video camera and/or a motion picture camera.

While the term "photo" is frequently used in this application it should be appreciated that the term "photo" should be interpreted as any visual image whether still or moving such as photos and/or videos.

While the terms "pole" and "elongated element" are frequently used in this application it should be appreciated that these two terms should be interpreted as follows:
 a) an object with length much longer than width or depth, whether of circular or another cross-section, or
 b) an item with a circular, prismatic or other cross section that may be held or placed at a distance from the user.

One embodiment of the present application is to provide a phone attachment to a ski pole or hiking pole. The pole can then be used as a selfie stick. This embodiment involves attaching a pivoting phone holder to the pole by the means of a split-ring circular clamp. The clamp is secured to the pole with a thumb screw. The screw also provides the pivot axis for the phone holder to rotate about, as will be illustrated in the figures below. While actively skiing or hiking, the phone holder is stowed flush with the pole. The phone holder is designed to nest around the pole so it doesn't interfere with skiing or hiking. When a selfie photo is desired, the phone holder is rotated away from the pole and the phone is attached to the phone holder. The phone may then be held away from the user using the pole as a selfie stick in the usual manner.

BRIEF DESCRIPTION OF THE FIGURES

FIG. 13 is an isometric view of the head of the fifth embodiment without the upper arm.

FIGS. 14A and 14B are two different isometric views of the upper arm of the fifth embodiment.

DRAWING-REFERENCE NUMBERS

| | |
|---|---|
| pole | 100 |
| spit ring | 110, 510, 610 |
| lug | 111, 112, 211, 212, 311, 312 |
| lug hole | 116 |
| threaded lug hole | 118 |
| pivot | 120 |
| pivot head | 122 |
| pivot threads | 124 |
| phone holder | 125, 525, 625 |
| base | 130, 330, 430, 530, 630, 730 |
| tang | 132, 332, 632, 732 |
| tang hole | 133 |
| lower arm | 134, 534 |
| connecting rod hole | 135 |

-continued

| lip | 136 |
| slot | 138 |
| base inner surface | 139 |
| head | 140, 440, 540 |
| gap | 141, 142 |
| upper arm | 144, 544 |
| head inner surface | 145, 545 |
| threaded hole | 146 |
| guide | 148 |
| void | 149 |
| connecting rod | 150 |
| connecting rod head | 152 |
| thread | 154 |
| spring | 174 |
| phone | 195 |
| upper phone edge | 196 |
| lower phone edge | 197 |
| handle | 202, 302 |
| Detents | 511, 533 |
| head nub | 541 |
| arm holes | 542 |
| head stop | 546, 547 |
| tab | 582 |
| upper arm inner surface | 583 |
| phone support | 604 |
| spacer | 714 |
| nut | 721 |

DETAILED DESCRIPTION-FIGS. 1 TO 6-FIRST EMBODIMENT

Figure 1:
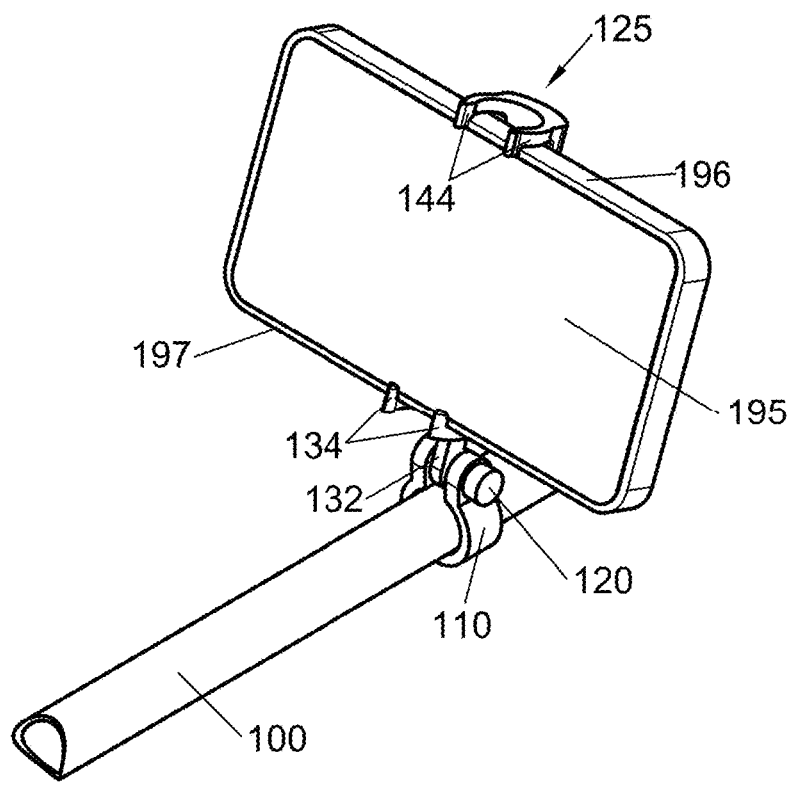
FIG. 1 is an isometric view of the first embodiment in the open position holding a phone.

FIG. 1 shows a first embodiment of the integrated selfie stick in the open or selfie position. Phone 195 includes edges 196 and 197. Phone holder 125 includes upper arms 144, lower arms 134, and tang 132. Phone 195 is held in phone holder 125 between upper arms 144 and lower arms 134. Phone holder 125 is rotatably attached to the pole 100 with split ring 110 and pivot 120 as described below.

Figure 2:
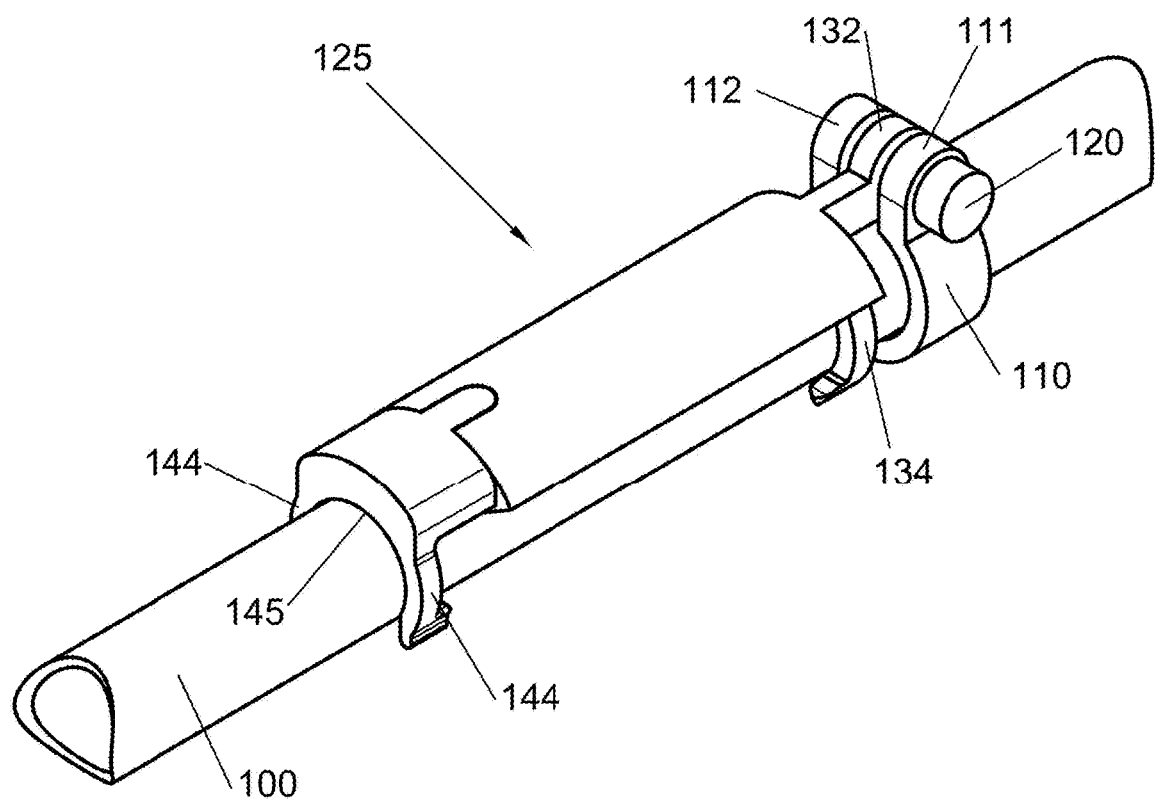
FIG. 2 is an isometric view of the first embodiment in the closed position.

FIG. 2 shows the first embodiment in the closed or stowed position. Phone holder 125 is closely aligned and nestled with pole 100 so as not to interfere with the main use of pole 100. Further details of the closed position will be described later in the operation section.

Figure 3:
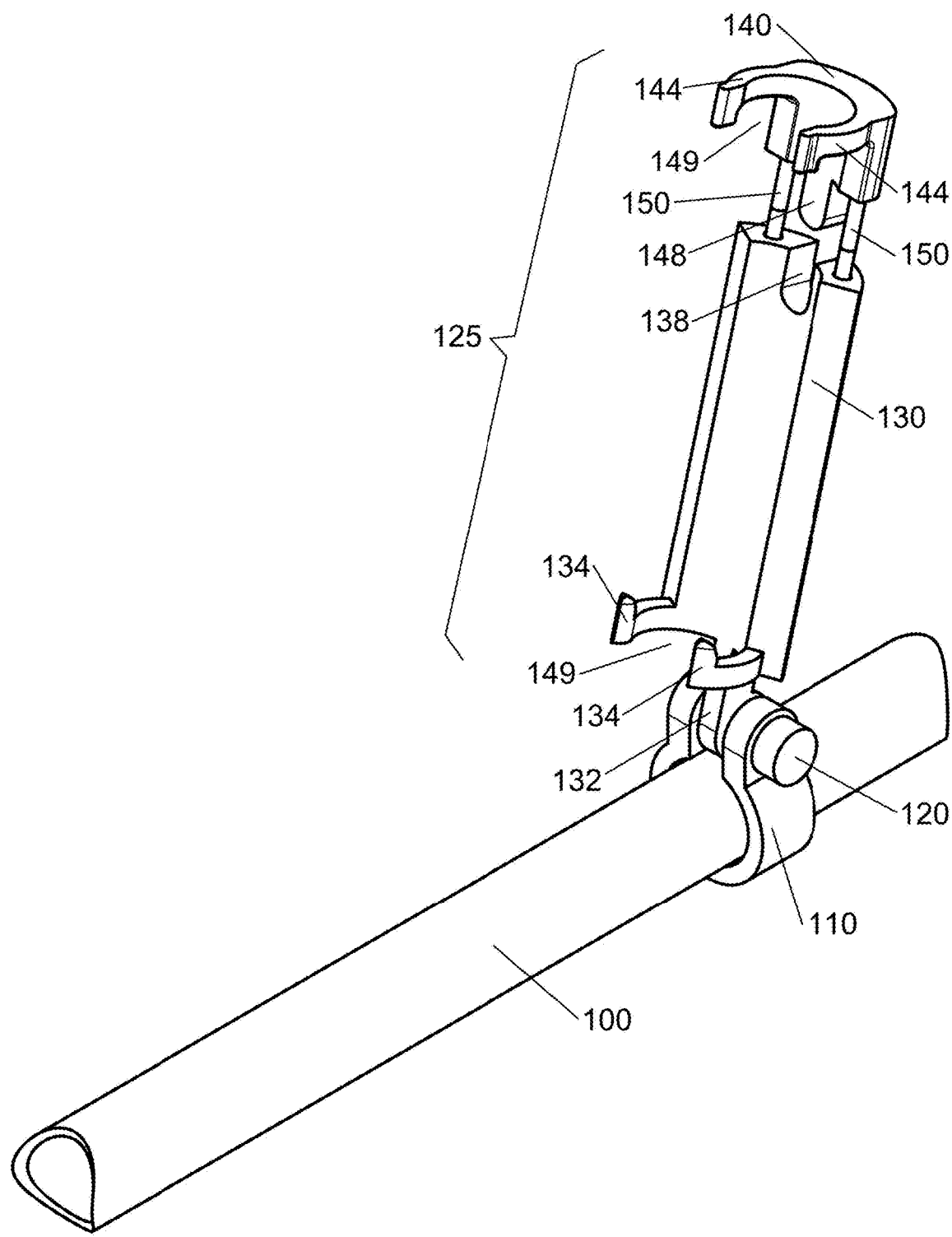
FIG. 3 is an isometric view of the first embodiment in the open position without a phone in place.
Figure 4:
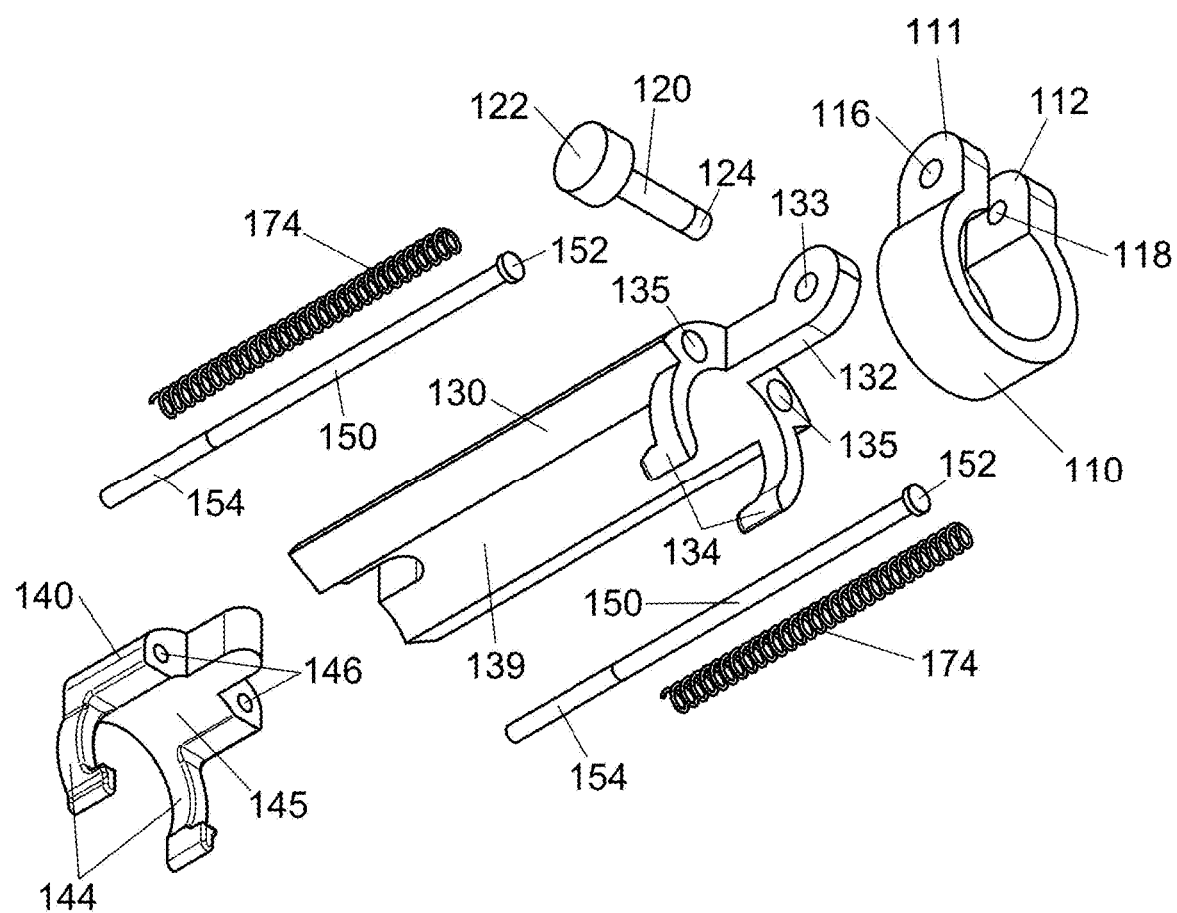
FIG. 4 is an exploded view of the first embodiment.

FIG. 3 shows the first embodiment in the open position without phone 195. Phone holder 125 includes a base 130, head 140, and connecting rods 150. Head 140 includes guide 148 and upper arms 144 separated by void 149. Further details of head 140 are shown in FIG. 4. These include threaded holes 146 and head inner surface 145. Referring back to FIG. 3, head 140 is attached to base 130 by connecting rods 150. Base 130 includes tang 132, lower arms 134, and slot 138. Lower arms 134 are separated by void 149. Further details of base 130, shown in FIG. 4, include tang hole 133, connecting rod holes 135, and base inner surface 139. Connecting rod holes 135 includes lips 136 shown in FIG. 6.

FIG. 4 is an exploded view showing additional details. Connecting rods 150 include connecting rod heads 152 and threads 154. Connecting rods 150 pass through springs 174. Pivot 120 is a thumb screw with pivot head 122 and pivot threads 124. Split ring 110 includes lugs 111 and 112. Lug 111 includes lug hole 116; lug 112 includes threaded lug hole 118. Base 130 includes tang 132, lower arms 134, connecting rod holes 135, as well as base inner surface 139. Head 140 includes upper arms 144, head inner surface 145, and threaded holes 146. Base 130 is attached to split ring 110 by inserting pivot 120 through lug hole 116 and tang hole 133. Pivot 120 is then screwed into threaded lug hole 118.

Referring to FIG. 4, phone holder 125 is assembled as follows: Connecting rods 150 are inserted into spring 174 and then into connecting rod hole 135 in base 130. Connecting rod 150 is then screwed into threaded hole 146 in head 140. Spring 174 is partially compressed between connecting rod head 152 and lip 136 (not shown) when connecting rod 150 is screwed in.

Figure 5:
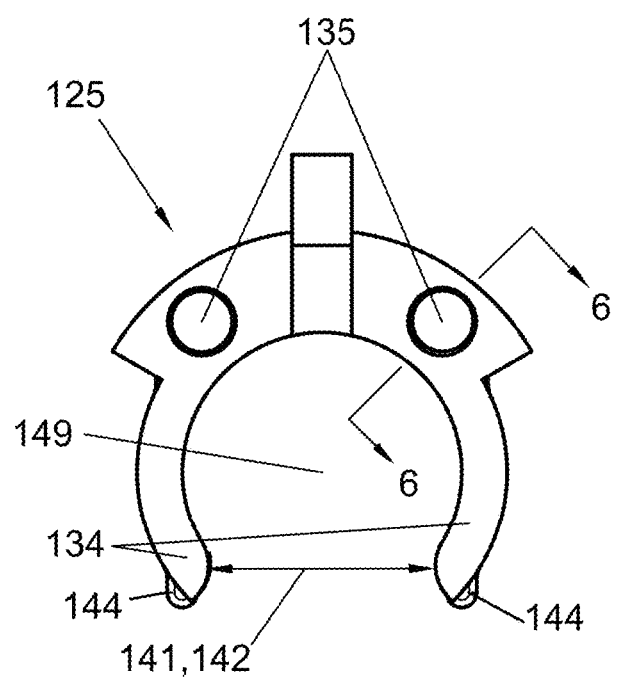
FIG. 5 is an end view of the first embodiment showing section line 6-6.

FIG. 5 is an end view of phone holder 125 showing section line 6-6. Gap 141 is the distance between the tips of lower arms 134. Gap 142 is the distance between the tips of upper arms 144. Gaps 141 and 142 may be less than the diameter of shaft 100.

Figure 6:
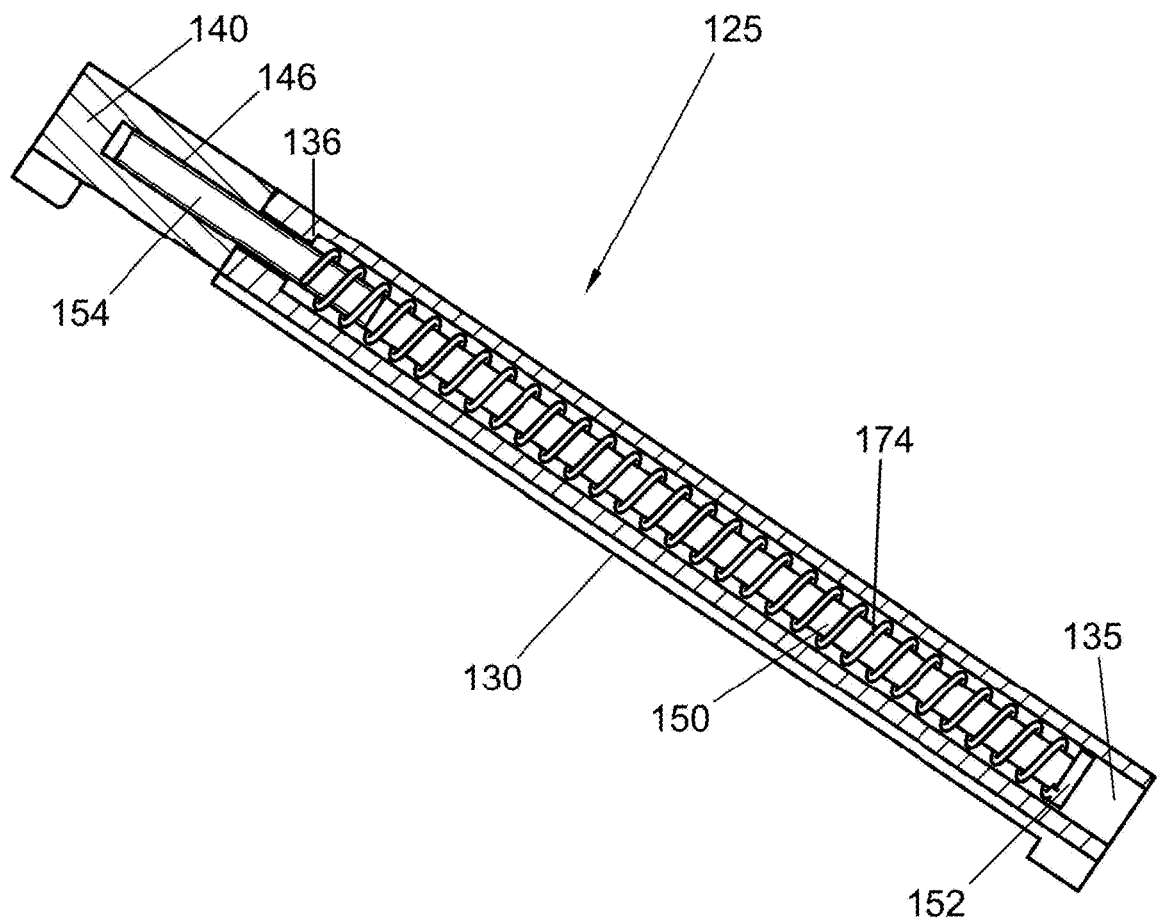
FIG. 6 is a cross section view of the first embodiment indicated by section line 6-6 in FIG. 5.

FIG. 6 is a cross section view of phone holder 125 along section 6-6, shown in FIG. 5. Connecting rod hole 135 has lip 136 on one end. Referring to FIGS. 4 and 6, phone holder 125 is assembled as follows: First connecting rods 150 are inserted into springs 174 and then into connecting rod hole 135 in base 130. Next, thread 154 on connecting rod 150 is fastened into threaded holes 146 in head 140. Springs 174 are partially compressed between connecting rod heads 152 and lips 136 as connecting rods 150 are tightened.

After phone holder 125 is assembled, head 140 may be moved away from base 130, further compressing springs 174.

Split ring 110, base 130 and head 140 are readily made of a suitable plastic, whereas pivot 120, connecting rods 150, and springs 174 can be made of stainless steel. Many alternate materials are possible as will be apparent to a person having ordinary skill in the art.

Operation

There are two different modes of operation of this apparatus: (1) the normal mode and (2) the selfie mode. In the normal mode phone holder 125 is in the closed position as shown in FIG. 2. In the closed position, the head inner surface 145 fits close to pole 100, as does base inner surface 139 (not visible in FIG. 2). Head inner surface 145 and base inner surface 139 may be shaped to conform to the outer surface of pole 100. Upper arms 144 and lower arms 134 are also shaped to fit alongside pole 100. Pole 100 nestles in voids 149. Gaps 141 and 142 (see FIG. 5) between the tips of upper arms 144 and lower arms 134 may be slightly smaller than the diameter of pole 100 in order to provide a snap fit in the closed position. The snap fit helps to retain phone holder 125 in the closed position during the normal activity. The closed position is also maintained by friction between lugs 111 and 112 and tang 132. Friction is achieved by tightening pivot 120. This also tightens split ring 110 against pole 100 preventing movement between them. In the normal mode, phone holder 125 is nestled around pole 100 and is out of the way of the activity for the intended use of pole 100, such as hiking, skiing or other activity.

In selfie mode, phone holder 125 and phone 195 are in an open position as shown in FIG. 1. Phone holder 125 is moved from normal mode to selfie mode by grasping phone holder 125 and rotating it to the desired position. Friction between tang 132 and lugs 111 and 112 resists this rotation and also holds phone holder 125 in the desired open position. The friction may be adjusted by tightening pivot 120. With proper adjustment of pivot 120, the friction may be set to an adequate amount to allow movement by the user's grasp, but otherwise prevent movement. Alternatively, the pivot 120 may be loosened before moving phone holder 125 and then retightened when phone 195 is positioned.

Once phone holder 125 is in the open position phone 195 may be inserted as follows. Upper phone edge 196 is placed against upper arms 144 and head 140 is moved away from base 130. Next, lower phone edge 197 is rotated against base 130 and lowered to contact lower arms 134. Movement of head 140 away from base 130 also moves connecting rods 150. This movement causes connecting rod heads 152 to compress springs 174 against lips 136 creating a tensile force in connecting rods 150. This tensile force results in a clamping force on phone edges 196 and 197, holding phone 195 in place.

Once phone 195 is in place, a selfie photo may be taken in the normal manner. The person uses pole 100 to hold phone 195 at a distance while taking the photo. Photo may be initiated by well-known processes of either using phone 195 self-timer function or pressing a remote activation button. Pivot 120 allows easy adjustment of phone 195 to properly frame the photo.

Split ring 110 allows flexibility on placement along the length of pole 100. For example, it may be desirable to place phone holder 125 on the opposite end from the handle (not shown) of hiking pole 100 to allow the user to hold the handle while taking a photo. Alternatively for cross country skiing, it may be desirable to place phone holder 125 near the handle (not shown) to minimize the swing weight of pole 100 while skiing. Pole 100 may then be held near the ski pole basket.

OTHER EMBODIMENTS-FIGS. 7 TO 17

Figure 7:
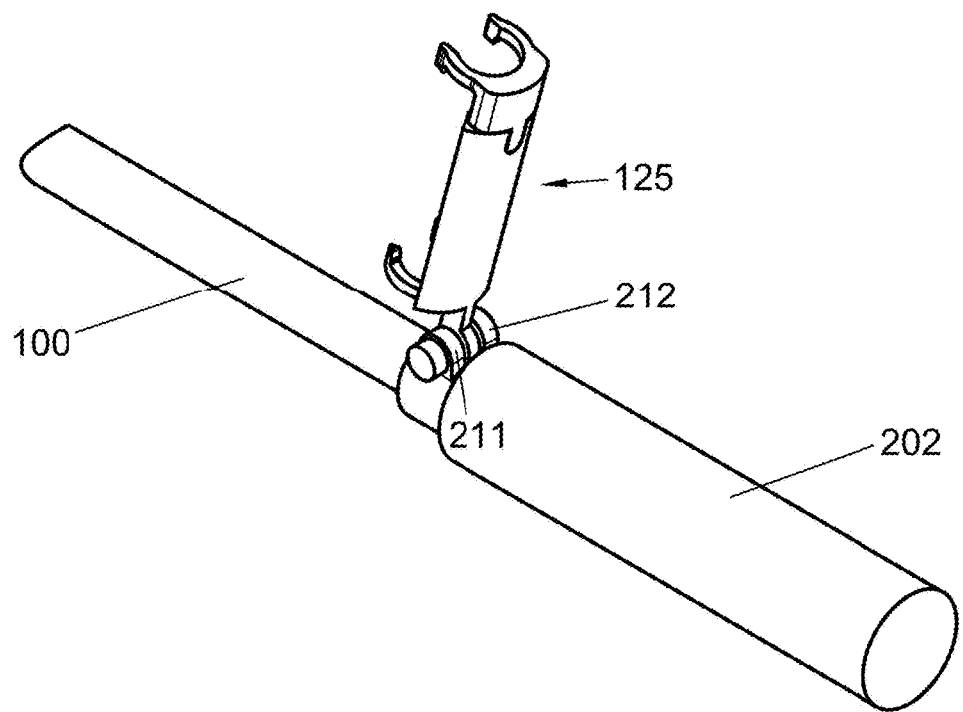
FIG. 7 is an isometric view of a second embodiment with two lugs integrated into the pole handle.

FIG. 7 shows a second embodiment. Handle 202 is connected to pole 100 and contains lugs 211 and 212. Molding lugs 211 and 212 into handle 202 eliminates the need for split ring 110. Other embodiments may attach one or more lugs 211 and 212 to any other functional element of the item of equipment. In addition to handles 202, functional elements include, but are not limited to, ski pole baskets, golf club heads, golf ball retriever heads, or similar parts attached to the elongated element. Functional elements are either part of the normal use or structure of the item of equipment.

Figure 8:
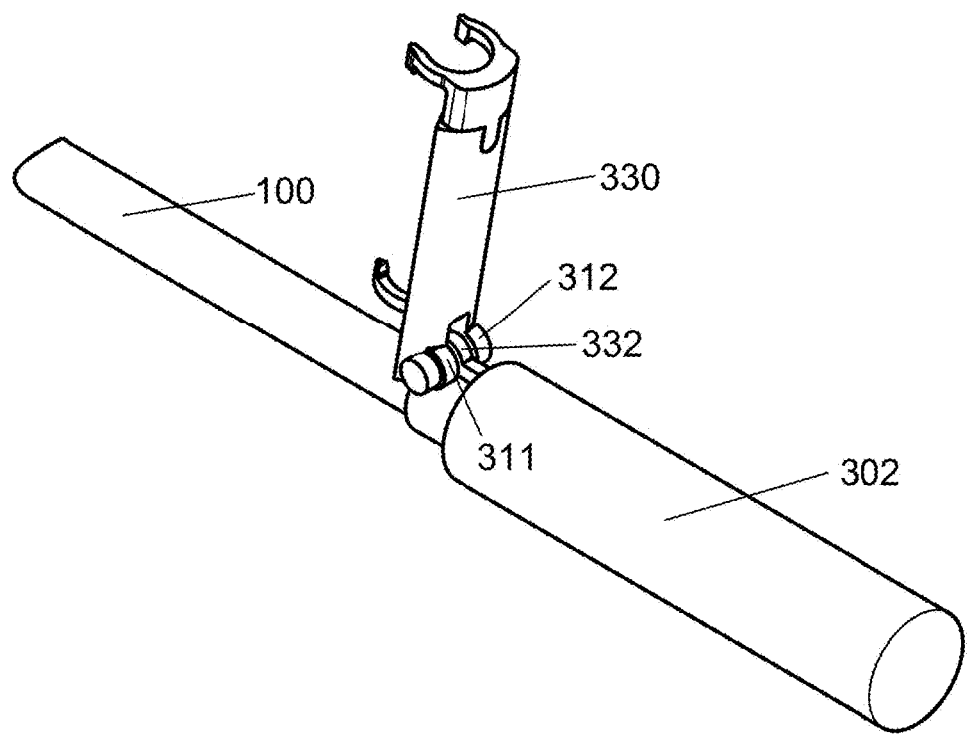
FIG. 8 is an isometric view of a third embodiment with a tang integrated into the pole handle.

FIG. 8 shows a third embodiment. Handle 302 is connected to pole 100 and contains tang 332. Base 330 now includes lugs 311 and 312. Again, the need for split ring 110 is eliminated. Other embodiments may attach one or more tangs 332 to any other functional element of the item of equipment. In addition to handles 302, functional elements include, but are not limited to ski pole baskets, golf club heads, golf ball retriever heads, or similar parts attached to the elongated element.

Figure 9:
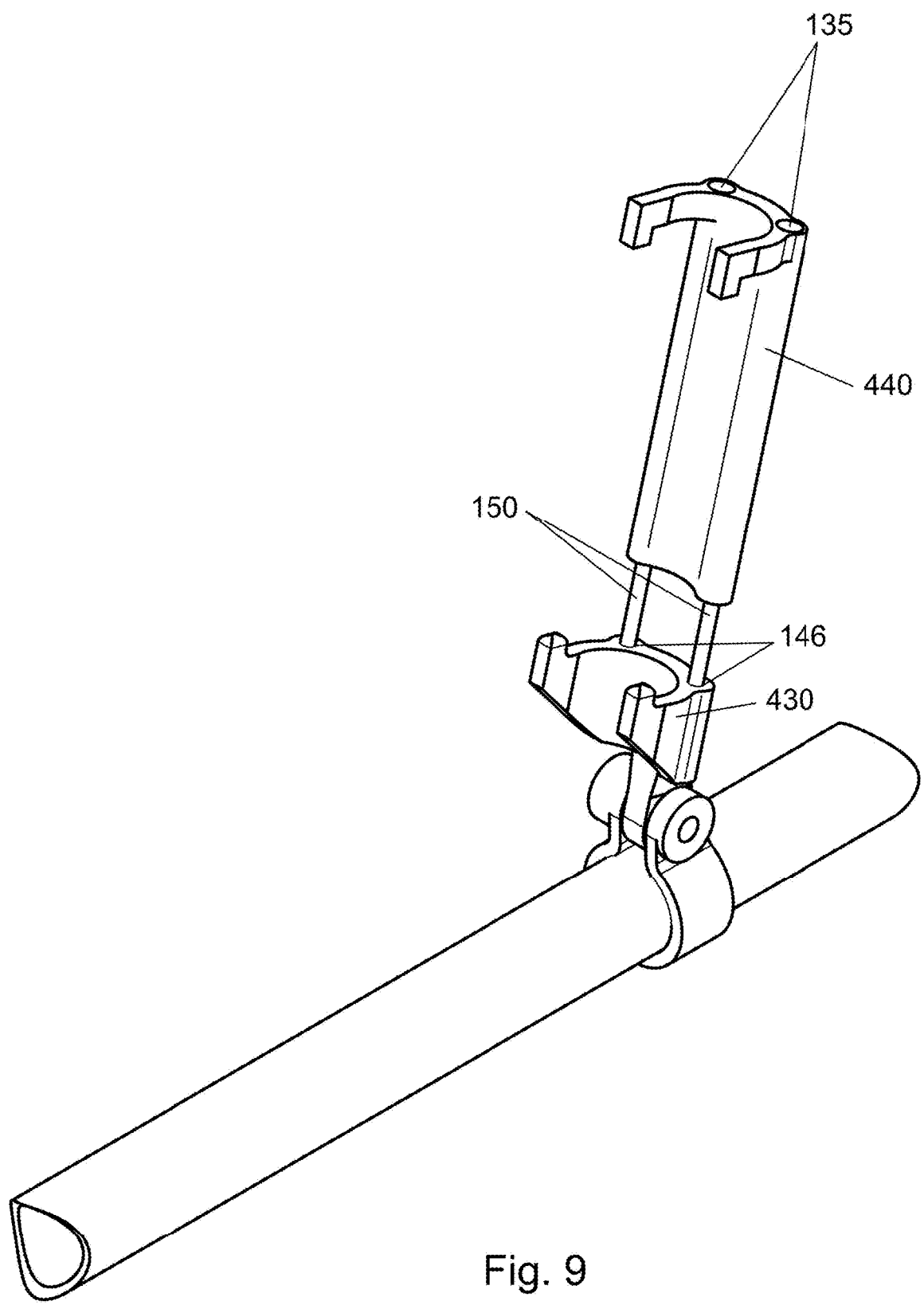
FIG. 9 is an isometric view of a fourth embodiment with springs contained inside the head rather than the base.

FIG. 9 shows a fourth embodiment in the open or selfie position without showing phone 195. Head 440 includes connecting rod holes 135, and lips 136 (not shown). Base 430 includes threaded holes 146. Connecting rods 150 and springs 174 (not shown) are inserted into connecting rod holes 135. Connecting rods are then screwed into threaded holes 146, partially compressing springs 174.

Figure 10:
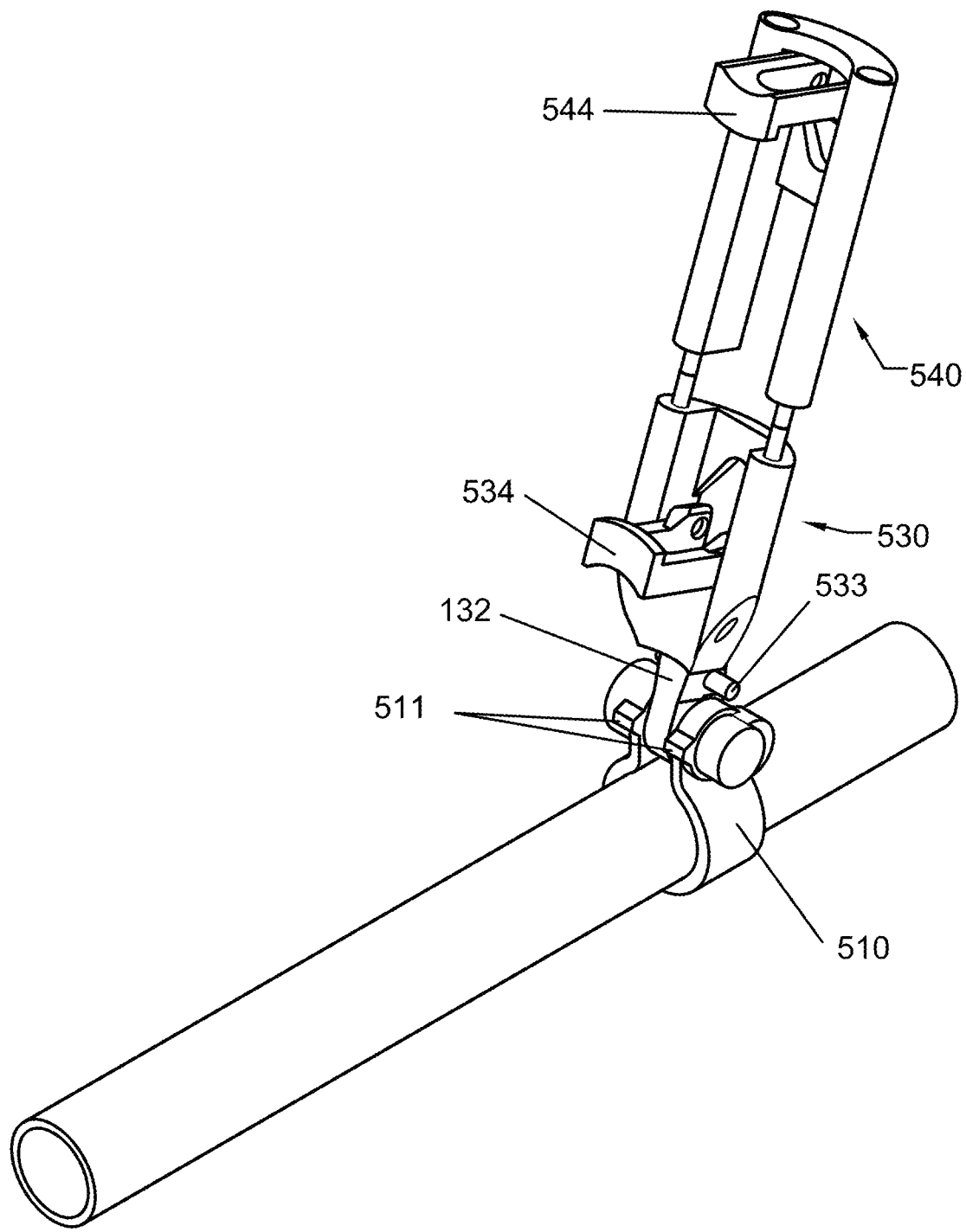
FIG. 10 is an isometric view of a fifth embodiment with rotating arms in the open position without showing the phone.

FIG. 10 shows a fifth embodiment in the open or selfie position. Base 530 includes lower arm 534, tang 132, and detents 533 (only one of two is clearly visible in this view). Head 540 includes upper arm 544. Phone 195 (not shown) is held between Lower arm 534 and upper arm 544. Lower arm 534 and upper arm 544 are rotatably attached to base 530 and head 540 respectively. Split ring 510 includes detents 511.

Figure 11:
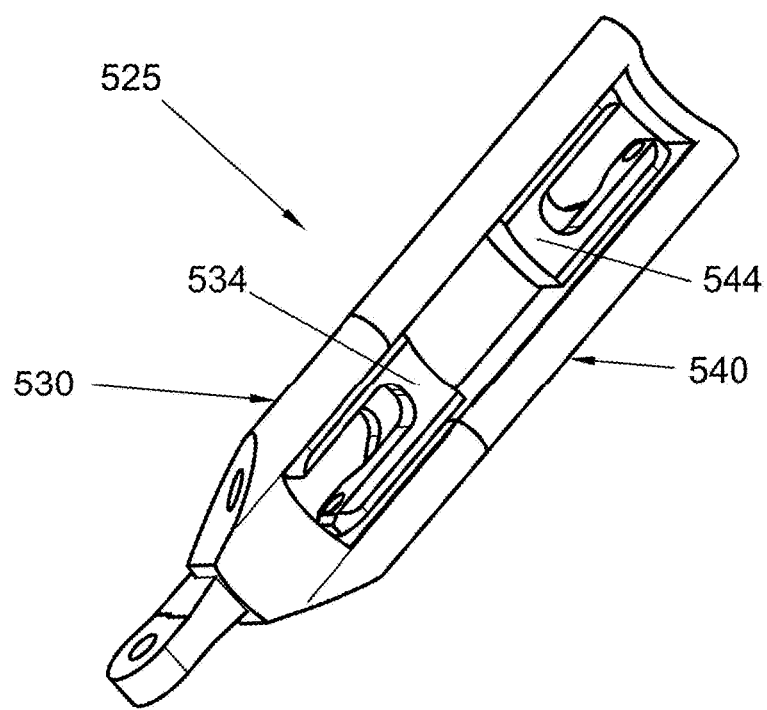
FIG. 11 is an isometric view of the phone holder of the fifth embodiment with rotating arms in the closed position.

FIG. 11 shows only phone holder 525 of the fifth embodiment in the closed position. In the closed position, lower arm 534 and upper arm 544 are rotated 90 degrees from their open position.

Figure 12A:
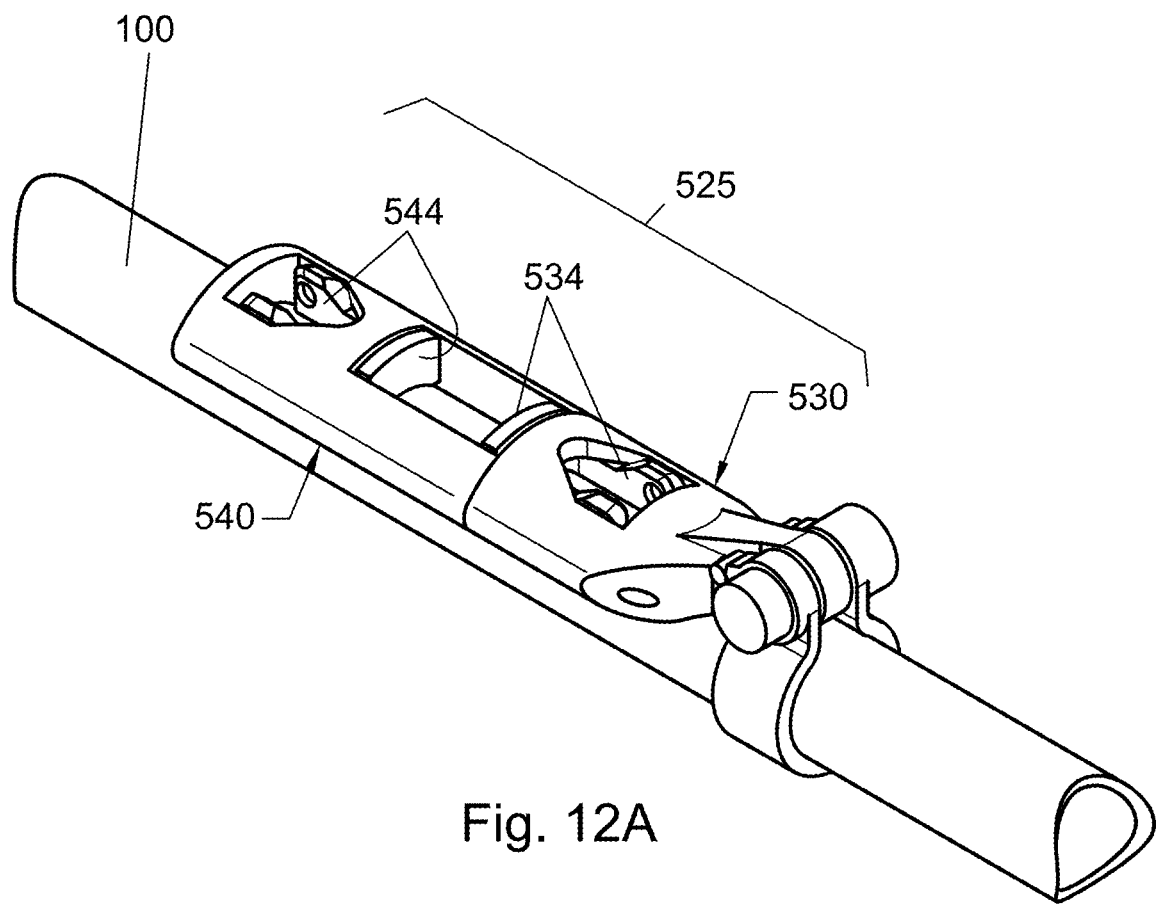
FIG. 12A is an isometric view of a fifth embodiment in the closed position.
Figure 12B:
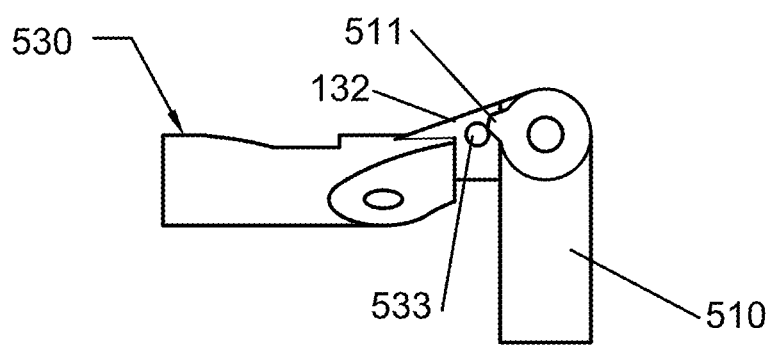
FIG. 12B is a side view of the fifth embodiment showing only the base and split ring.

FIGS. 12A and 12B show the fifth embodiment in the closed position. Rotating lower arm 534 and upper arm 544 into the closed position allows phone holder 525 to be nestled close to pole 100. FIG. 12B shows only split ring 510, tang 132 and base 530. The rotational interference between detents 511 and 533 keep phone holder 525 from inadvertently opening.

FIG. 13 is an isometric view of head 540 of the fifth embodiment without upper arm 544. This view is looking from the side of head 540 that nestles against pole 100. Head 540 includes head nubs 541, head inner surface, 545, and head stops 546 and 547. Head inner surface 545 is shaped to conform to the outer surface of pole 100 (not shown).

FIGS. 14A and 14B are two different isometric views of upper arm 544 showing further details. Upper arm 544 includes arm holes 542, tab 582, and upper arm inner surface 583. Head nubs 541 (shown in FIG. 12) fit into arm holes 542 allowing upper arm 544 to rotate relative to head 540. In the closed position, upper arm 544 is rotated to contact head stop 547 (as shown in FIG. 11). In the closed position, upper arm 544 is substantially aligned and nestled around pole 100 as shown in FIGS. 11 and 12. In the open position, upper arm 544 is rotated to contact head stop 546 (as shown in FIG. 10). Tab 582 prevents phone 195 (not shown) from falling out.

Base 530 and lower arm 534 have similar features (not shown) to head 540 and upper arm 544 allowing lower arm 534 to rotate between open and closed positions (shown in FIGS. 10 to 12).

Figure 15A:
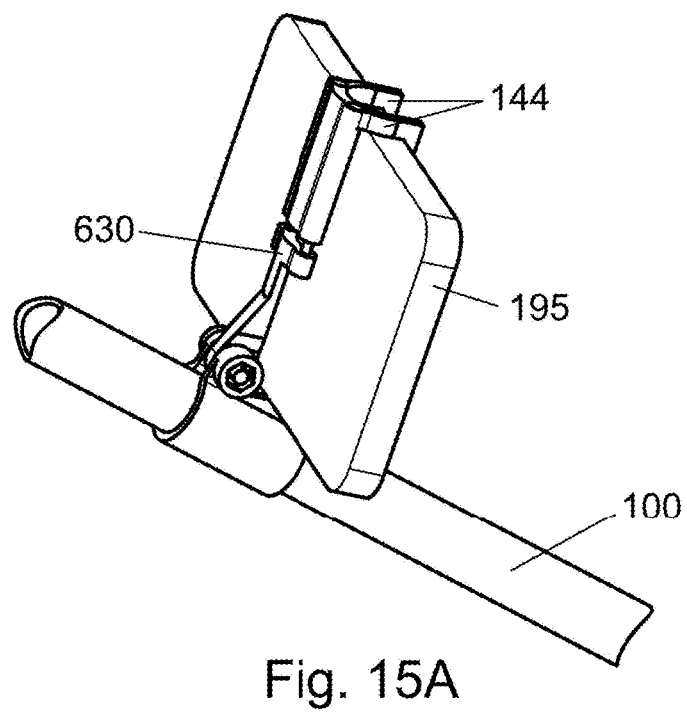
FIGS. 15A and 15B are two different isometric views of the sixth embodiment in the open position.
Figure 15B:
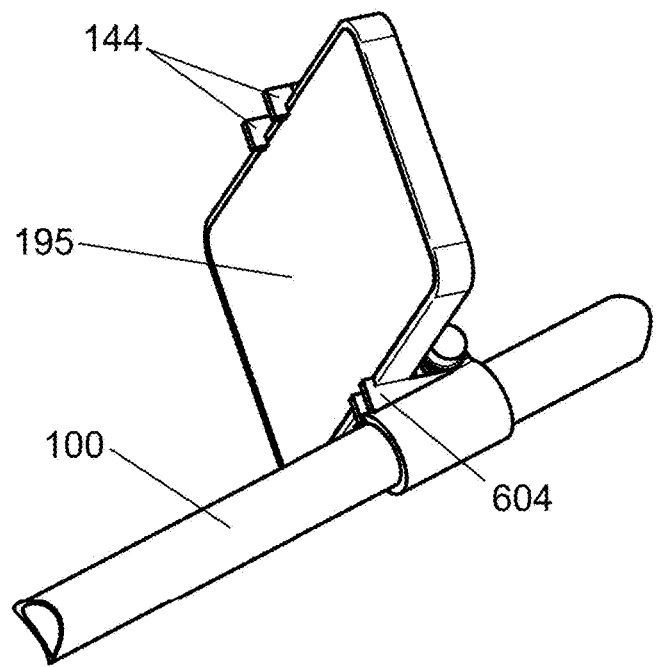

FIGS. 15A and 15B show two different views of a sixth embodiment. Base 630 has no lower arms 134, but is otherwise similar to base 430 in the fourth embodiment. Phone support 604 is attached to pole 100. Phone 195 is held in place between upper arms 144 and phone support 604.

Figure 16:
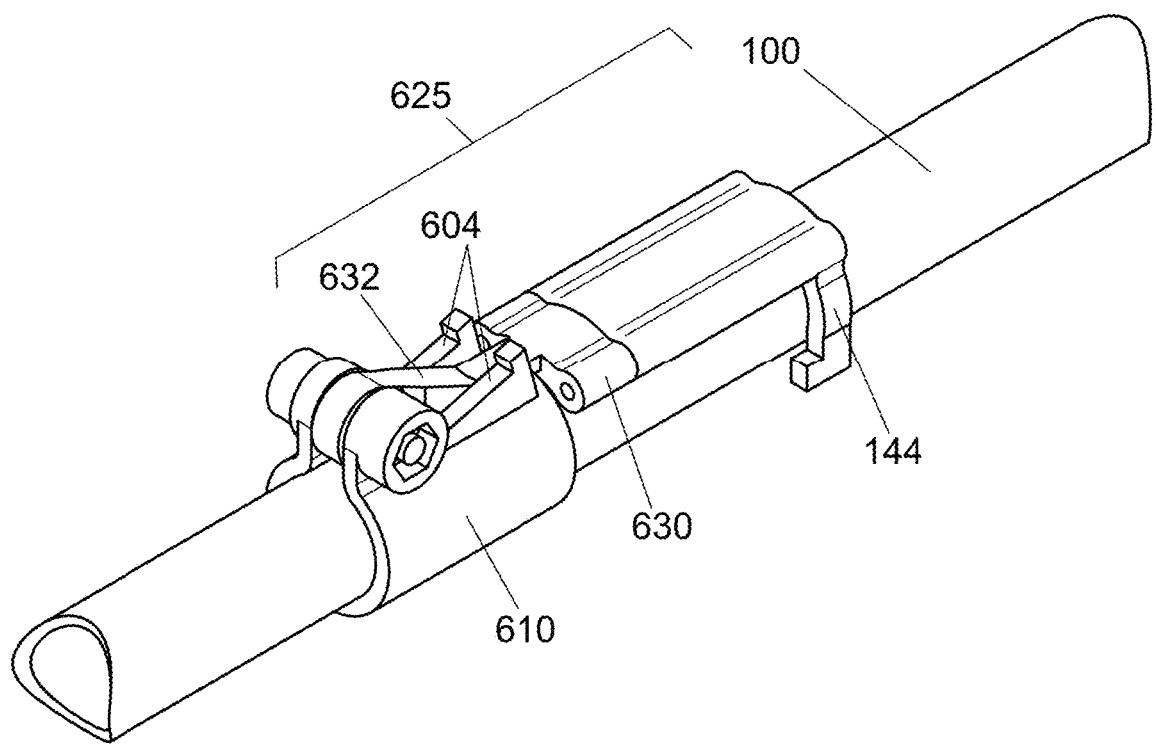
FIG. 16 is an isometric view of the sixth embodiment in the closed position.

FIG. 16 shows the sixth embodiment in the closed position. Phone holder 625 is substantially aligned with pole 100. Split ring 610 includes phone supports 604. Base 630 includes tang 632 which lies between phone supports 604 in the closed position.

Figure 17:
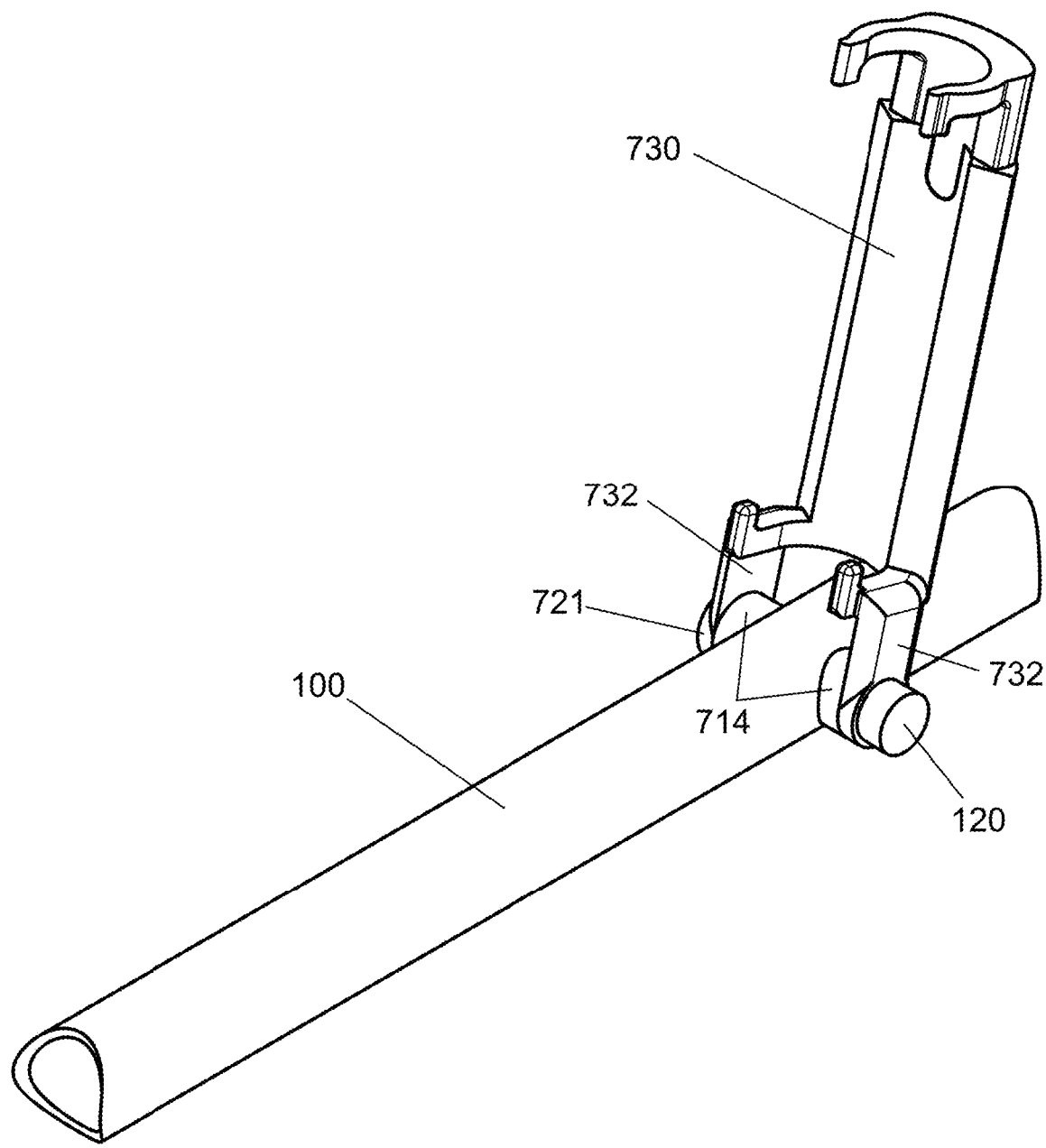
FIG. 17 is an isometric view of a seventh embodiment with a pivot passing through a hole in the pole.

FIG. 17 shows a seventh embodiment in the open position without phone 195. Base 730 includes two tangs 732. Pivot 120 passes directly through pole 100 and is secured with nut 721. Spacers 714 provide mounting surfaces for tangs 732. In another embodiment, spacers 714 may be eliminated allowing tangs 732 to directly contact pole 100. This embodiment also eliminates the need for split ring 110.

CONCLUSIONS, RAMIFICATIONS, AND SCOPE

Accordingly, the reader will see that the integrated selfie attachment of the various embodiments can be used to conveniently convert an item of equipment into a selfie stick, relieving the need to pack a separate selfie stick. In addition, it allows the user to take selfies in remote locations of better quality than holding phone 195 at arm's length.

Furthermore, the integrated selfie attachment has additional advantages in that:
a) The compact design allows it to be stowed in a way that does not interfere with the normal use of the equipment.
b) Its light weight minimizes the impact on the normal use of the equipment for high energy activities like cross country skiing and golfing.
c) It is easy to switch from stowed position to the selfie position.
d) It does not require a separate piece of equipment to be carried and then attached to pole 100.
e) It is inexpensive to manufacture.

f) It may be retrofitted into existing equipment as well as integrated into new designs.

g) It may be used with a wide variety of equipment: from sports equipment like ski poles and golf clubs to household equipment like brooms and rakes.

Although the description above contains many specificities, these should not be construed as limiting the scope of the embodiments but as merely providing illustrations of some of the embodiments. For example, other embodiments may include such variations as:

a) Pivot 120 may be attached to pole 100 by means such as, but not limited to:
  i. Split ring 110 may have two diametrically opposed bosses which act as pivot 120; base 730 with two tangs 732 may then rotate about such a pivot 120.
  ii. Pivot 120 may consist of two diametrically opposed bosses molded into handle 202, or a ski basket or other functional element already on pole 100; base 730 with two tangs 732 may then rotate about pivot 120.

b) Split ring 110 may be adjustable to conform with different diameter poles 100 with methods such as but not limited to:
  i. Using one or more shims along the inner surface of split ring 110.
  ii. Using a compliant material such as rubber or polyurethane foam along the inner surface of split ring 110.
  iii. Using wire ties to attach lugs 111 and 112 to pole 100.
  iv. Using one of the many types of hose clamps to attach lugs 111 and 112 to pole 100.
  v. Integrating the clasping mechanism of one of the many types of hose clamps into split ring 110.

c) Different arrangements to connect head 140 to base 130 are possible such as:
  i. Using any suitable elastomeric material elastic element to provide the clamping force instead of springs 174.
  ii. Using one or more tension springs to provide the clamping force instead of springs 174.
  iii. Using one or multiple groups of connecting rod 150 or spring 174.
  iv. Elimination of guide 148 and slot 138.
  v. Eliminate connecting rods 150 and using one or more guides 148, and slots 138 to attach head 140 to base 130.

d) A friction washer may be inserted between lugs 111 and 112 and tang 132.

e) Detents may be added to lugs 111 and 112 and tang 132 to set the angle of phone holder 125 relative to pole 100.

f) Detents 511 and 533 may be added to lugs 111 and 112 and tang 132 to retain phone holder 125 in the closed position.

g) Phone 195 may be attached to phone holder 125 by other means such as using magnetic forces.

h) The integrated selfie stick may be adapted to a wide variety of items, including but not limited to:
  i. Sports equipment: golf clubs, golf ball retrieval poles, paddles, oars, fishing poles, fishing wading staffs, racquets, tent poles, and lacrosse sticks.
  ii. Household items: umbrellas, canes, brooms, rakes, shovels, mops, chairs, and extendable suitcase handles.

Other embodiments may combine any combination of elements of the above embodiments. Thus, the scope of the embodiments should be determined by the appended claims and their legal equivalents, rather than the examples given.

I claim:

1. An article for taking photos comprising:
  a. a phone holder for removably attaching a phone,
  b. a pivot to rotatably attach said phone holder to a pole of an item normally used for an activity other than taking photos allowing said phone holder to be stored in a first position substantially aligned with and adjacent to said pole, whereby said phone holder does not obstruct said activity while stored and may be rotated to a second position to attach said phone to take photos,
  c. said phone holder further comprises 2 arms for the purpose of supporting an edge of said phone, wherein said arms are separated by a void and the tips of said arms are shaped to form a gap that is smaller than the diameter of said pole, and
  d. said pole is positioned in said void when said phone holder is stored in said first position such that said tips create a snap fit, whereby said phone holder is stored securely during said activity.

2. The article for taking photos of claim 1, wherein said item is an item of sports equipment.

3. The article for taking photos of claim 2, wherein said item of sports equipment is a ski pole.

4. The article for taking photos of claim 2, wherein said item of sports equipment is a hiking pole.

5. The article for taking photos of claim 2, wherein said item of sports equipment is an item of golf equipment.

6. The article for taking photos of claim 1, wherein said item is an item of household equipment.

7. A method of using an item of equipment, normally used for an activity other than taking photos, as a selfie stick comprising:
  a. rotatably attaching a phone holder to an elongated element of said item of equipment,
  b. storing said phone holder in a first position substantially aligned with and adjacent to said elongated element so as not to interfere with the normal use of said item of equipment,
  c. securing said phone holder in said first position with a snap fit whereby said phone holder is retained in said first position during said activity,
  d. rotating said phone holder relative to said elongated element into a second position for taking photos and placing a phone in said phone holder, and
  e. using said elongated element to position said phone further from the subject than can be achieved by holding said phone directly for the purpose of taking a photo.

8. An article for taking photos comprising:
  a. a phone holder for removably attaching a phone,
  b. a pivot to rotatably attach said phone holder to a pole of an item normally used for an activity other than taking photos allowing said phone holder to be stored in a first position substantially aligned with and adjacent to said pole, whereby said phone holder does not obstruct said activity while stored and may be rotated to a second position to attach said phone to take photos,
  c. said phone holder further comprises one or more arms for the purpose of supporting an edge of said phone, wherein said arms are rotatably attached to said phone holder and
  d. said phone holder further comprises a tang comprising a detent to create a retaining force when said phone holder is stored in said first position, whereby said phone holder is stored securely during said activity.

* * * * *